US005842134A

United States Patent [19]

Brown et al.

[11] Patent Number: 5,842,134

[45] Date of Patent: Nov. 24, 1998

[54] AUTO-ALIGNMENT OF CLEAR VOICE AND LOW SPEED DIGITAL DATA SIGNALS IN A SIMULCAST SYSTEM

[75] Inventors: Thomas A. Brown; Robert Canada, both of Lynchburg, Va.

[73] Assignee: Ericsson Inc., Research Triangle Park, N.C.

[21] Appl. No.: 535,932

[22] Filed: Sep. 28, 1995

[51] Int. Cl.[6] .............................. H04B 7/005; H04B 7/01

[52] U.S. Cl. .......................... 455/503; 370/529; 375/364

[58] Field of Search .............................. 455/20, 22, 33.4, 455/51.1, 51.2, 53.1, 56.1, 502, 503, 507, 517, 524, 67.1, 67.4, 67.6, 74; 370/522, 527, 528, 529; 375/363, 364

[56] References Cited

U.S. PATENT DOCUMENTS

| | | | |
|---|---|---|---|
| 3,902,161 | 8/1975 | Kiowaski et al. . | |
| 4,218,654 | 8/1980 | Ogawa et al. . | |
| 4,255,814 | 3/1981 | Osborn . | |
| 4,317,220 | 2/1982 | Martin . | |
| 4,411,007 | 10/1983 | Rodman et al. . | |
| 4,414,661 | 11/1983 | Karlstrom . | |
| 4,472,802 | 9/1984 | Pin et al. . | |
| 4,475,246 | 10/1984 | Batlivala et al. . | |
| 4,516,269 | 5/1985 | Krinock | 455/51.2 |
| 4,570,265 | 2/1986 | Thro . | |
| 4,578,815 | 3/1986 | Persinotti . | |
| 4,597,105 | 6/1986 | Freeburg . | |
| 4,608,699 | 8/1986 | Batlivala et al. . | |
| 4,642,633 | 2/1987 | Dunkerton et al. | 455/56.1 |
| 4,696,051 | 9/1987 | Breeden . | |
| 4,696,052 | 9/1987 | Breeden . | |
| 4,903,262 | 2/1990 | Dissosway et al. . | |
| 4,903,321 | 2/1990 | Hall et al. . | |
| 4,905,302 | 2/1990 | Childress et al. . | |
| 4,918,437 | 4/1990 | Jasinski et al. . | |
| 4,926,496 | 5/1990 | Cole et al. . | |
| 4,939,746 | 7/1990 | Childress . | |
| 4,968,966 | 11/1990 | Jasinski et al. . | |
| 4,972,410 | 11/1990 | Cohen et al. . | |
| 5,003,617 | 3/1991 | Epsom et al. . | |
| 5,128,934 | 7/1992 | Jasinski . | |
| 5,134,708 | 7/1992 | Marui et al. | 455/67.7 |
| 5,172,396 | 12/1992 | Rose, Jr. et al. . | |
| 5,287,550 | 2/1994 | Fennell et al. . | |
| 5,347,562 | 9/1994 | Candy | 455/51.1 |
| 5,423,058 | 6/1995 | Cudak et al. | 455/51.2 |
| 5,477,539 | 12/1995 | Brown | 455/503 |

FOREIGN PATENT DOCUMENTS

| | | |
|---|---|---|
| 0 445 027 | 9/1991 | European Pat. Off. . |
| 0 635 988 | 1/1995 | European Pat. Off. . |
| 61-107826 | 5/1986 | Japan . |
| 96/12360 | 4/1996 | WIPO . |

*Primary Examiner*—Reinhard J. Eisenzopf
*Assistant Examiner*—Sam Bhattacharya
*Attorney, Agent, or Firm*—Nixon & Vanderhye PC

[57] ABSTRACT

In a wide band radio frequency (RF) simulcast communications system analog voice signals are distributed in a digitized form over high speed data channels and processed as high speed data. A conventional Ericsson, Inc. EDACS™ simulcast communications system is improved by altering the apparatus and manner by which "clear voice" (unencrypted analog voice) is distributed from a control point and "aligned" at multiple transmitter sites for simultaneous RF broadcasting. In the improved arrangement, the EDACS™ simulcast system inherent digital data stream alignment process produces the requisite time domain alignment for the digitized "clear voice" signals without the need for costly analog audio alignment procedures and equipment.

4 Claims, 4 Drawing Sheets

AUTO-ALIGNMENT OF CLEAR VOICE AND LOW SPEED DIGITAL DATA SIGNALS IN A SIMULCAST SYSTEM

CROSS-REFERENCES TO RELATED APPLICATIONS AND PATENTS

This application is somewhat related to commonly-assigned U.S. Pat. No. 5,172,396 to Rose et al., issued on Dec. 15, 1992, entitled "Public Service Trunking Simulcast System," and U.S. Pat. No. 5,127,101 to Rose, Jr., issued Jun. 30, 1992, entitled "Simulcast Auto Alignment System." This application is also somewhat related to the following commonly-assigned copending applications: Ser. No. 07/824,123, now U.S. Pat. No. 5,517,680, of Brown et al. entitled "Self Correction of PST Simulcast System Timing", filed Jan. 22, 1992, now U.S. Pat. No. 5,517,680, issued May 14, 1996 and Ser. No. 08/364,467 of Brown entitled "Simulcast Resynchronization Improvement Using GPS", filed Dec. 27, 1994. The disclosures of each of the above patents and applications are incorporated by reference as if expressly set forth herein.

FIELD OF THE INVENTION

This invention relates to radio frequency (RF) signal transmission systems, and in particular to "simulcasting" systems for providing the simultaneous transmission of the same information by two or more separately located RF transmitters. More particularly, the invention relates to an improvement in the alignment of "clear voice" (non-encrypted analog voice) audio signals between transmitting sites.

BACKGROUND AND SUMMARY OF THE INVENTION

As is well known, it is sometimes not possible for a single RF transmitting site to provide adequate coverage to a large desired coverage area due to FCC power limitations, geographical and/or other factors. For example, government entities commonly use land-mobile radio communications systems to provide communications between a headquarters and various mobile and portable radio users that roam throughout the jurisdiction of the governmental entity. In some cases the geographical area of jurisdiction is so large that it is not possible for a single land-based RF transmitting site to cover it.

Even if the effective radiated power of the single transmission site was sufficiently great to cover the entire area, users in outlying or fringe areas might receive only spotty service because of the "line-of-site" nature of VHF transmissions and/or due to geographical obstructions (e.g., hills, bridges, buildings, and the curvature of the earth) interposed between the single transmitter site and various fringe locations within the coverage area.

One known way to expand the coverage area is to provide multiple, "simulcasting" transmitting sites. In order to simplify mobile radio operation and conserve radio frequency spectrum, such "simulcasting"RF transmitting sites all transmit substantially identical signals at substantially identical times on substantially identical radio frequencies. Such "simulcasting" eliminates control overhead and other complexities associated with performing "hand offs" from one RF transmitting site coverage area to another as is common, for example, in cellular and "multi-site" RF communications systems. So-called "simulcasting" digitally trunked RF repeater systems are generally known. The following is a listing (which is by no means exhaustive) of prior documents that describe various aspects of RF transmission simulcasting and related issues:

U.S. Pat. No. 5,172,396 to Rose et al.;
U.S. Pat. No. 4,903,321 to Hall et al.;
U.S. Pat. No. 4,696,052 to Breeden;
U.S. Pat. No. 4,696,051 to Breeden;
U.S. Pat. No. 4,718,109 to Breeden et al.
U.S. Pat. No. 5,245,634 to Averbuch;
U.S. Pat. No. 5,287,550 to Fennell et al;
U.S. Pat. No. 4,782,499 to Clendening;
U.S. Pat. No. 5,052,028 to Zwack;
U.S. Pat. No. 4,570,265 to Thro;
U.S. Pat. No. 4,516,269 to Krinock;
U.S. Pat. No. 4,475,246 to Batlivala et al.;
U.S. Pat. No. 4,317,220 to Martin;
U.S. Pat. No. 4,972,410 to Cohen et al.;
U.S. Pat. No. 4,608,699 to Batlivala et al.;
U.S. Pat. No. 4,918,437 to Jasinski et al.;
U.S. Pat. No. 4,578,815 to Persinotti;
U.S. Pat. No. 5,003,617 to Epsom et al.;
U.S. Pat. No. 4,939,746 to Childress;
U.S. Pat. No. 4,903,262 to Dissosway et al.;
U.S. Pat. No. 4,926,496 to Cole et al.;
U.S. Pat. No. 4,968,966 to Jasinski et al;
U.S. Pat. No. 3,902,161 to Kiowaski et al;
U.S. Pat. No. 4,218,654 to Ogawa et al;
U.S. Pat. No. 4,255,815 to Osborn;
U.S. Pat. No. 4,411,007 to Rodman et al;
U.S. Pat. No. 4,414,661 to Karlstrom;
U.S. Pat. No. 4,472,802 to Pin et al.;
U.S. Pat. No. 5,046,128 to Bennett;
U.S. Pat. No. 5,014,344 to Goldberg;
U.S. Pat. No. 4,850,032 to Freeburg;
U.S. Pat. No. 4,597,105 to Freeburg; and
Japanese Patent Disclosure No. 61-107826.

U.S. Pat. No. 5,172,396, issued Dec. 15, 1992 to Rose et al., entitled "Public Service Trunking Simulcast System", discloses a trunked radio simulcast system having control site and remote site architectures that include RF transmission timing synchronization features that are relevant to the presently preferred exemplary embodiment. In addition, U.S. Pat. No. 4,903,321, issued Feb. 20, 1990 to Hall et al., entitled "Radio Trunking Fault Detection System," discloses a trunked radio repeater system having a radio frequency repeater site architecture that includes fault and call testing and failure detection features that are somewhat relevant to the present invention. These patents are both commonly assigned to the assignee of the present invention and are both incorporated by reference herein.

While simulcasting thus provides various advantages as compared to other techniques for expanding coverage area, it also introduces its own particular set of complexities that must be dealt with. By way of illustration, please refer to FIG. 1A—which is a schematic diagram of an exemplary three-site simulcasting digitally trunked land-mobile RF communications system 10. System 10 includes three simulcasting transmitting sites, S1, S2 and S3. The transmissions of site S1 cover the coverage area A1, and similarly, the transmissions of sites S2 and S3 cover respective coverage areas A2, A3. A central control point C coupled to each of sites S1, S2 and S3 via respective communication links (L1–L3) delivers, in real time, substantially identical signaling (including digital control channel signaling and associated timing information) for transmission by the various sites.

Each RF channel at all sites is modulated with amplitude, phase and time delay corrected information. To accomplish this, time, phase and amplitude stable communication links must be provided between a main control point site and all other simulcast transmit sites by means of a high quality phase-stable back-bone communication system arrangement (e.g., radio, microwave or fiber optic). In this regard, commercial wire-common-carriers do not provide the degree of stability required for simulcast; whereas, dedicated, user controlled, voice/data grade, synchronous multiplex used in conjunction with radio, microwave or fiber optic back-bone distribution paths most effectively do provide the needed communications circuits and stability for simulcast.

Exemplary system 10 is preferably a digitally trunked simulcast communications system of the type marketed by Ericsson, Inc. under the trade name EDACS. This system provides a digital RF control channel and plural RF working channels. In such a digitally trunked system, an exemplary mobile radio unit M within one (or more) of coverage areas A1–A3 continuously monitors an "outbound" digital control channel when it is not actually engaged in active communications on a working channel with other units. Mobile M may request communications by transmitting a channel assignment request message on an "inbound" control channel. Upon receipt of such channel assignment request (and presuming that at least one working channel is available for temporary assignment to mobile unit M and other units with which mobile unit M wishes to communicate), control point C responds by causing a control channel assignment message to be transmitted by each site S1–S3 over the outbound control channel. In simulcast system 10, this channel assignment message is transmitted simultaneously by each of transmitting sites S1–S3 over the same outbound control channel frequency (such that mobile unit M and other mobile units "called" by the channel assignment message will receive the message regardless within which coverage areas A1–A3 they may happen to be located). Mobile unit M (and other called mobile units) respond to the received outbound trunking control channel assignment message by changing frequency to an RF working channel and conducting communications on the working channel. Once the working channel communications are concluded, the mobile unit M (and other called mobile units) return to monitoring the outbound control channel for additional messages directed to them.

Referring once again to FIG. 1A, suppose mobile unit M is located within an overlap area X wherein coverage areas A2 and A3 overlap one another. Within this overlap area X, mobile unit M will receive (perhaps at approximately equal signal strength levels) the outbound control channel transmission of site S2 and also the outbound control channel transmission of site S3. Simulcast system 10 is appropriately designed such that such outbound control channel transmissions from sites S2 and S3 are on substantially the same RF frequency so that no heterodyning or other interference occurs. Similarly, control point C sends, over links L1–L3, substantially identical outbound control channel messages for transmission by each of sites S1–S3.

However, a problem can arise if the outbound control channels are not precisely synchronized to one another. A transceiver located within overlap region X that receives outbound control channel synchronization signals delayed with respect to one another by even a small time period (e.g., more than a one-half bit period, or about 52 microseconds for 9600 baud operation) could end up losing bits and/or temporarily losing synchronization, bit recovery and error checking capabilities.

Delays due to the limited speed at which electromagnetic waves propagate must be taken into account in systems simulcasting data at high data transmission rates (an RF signal travels "only" about 300 meters in one microsecond). It is possible (and usually necessary) to adjust the relative effective radiated power levels of the site transmitters so that the distances across the overlap regions X are kept less than a desired maximum distance—and thus, the difference in the RF propagation delay times across an overlap region due to the different RF path lengths between the site and a receiver within the overlap region is minimized. Even with this optimization, however, it has been found that (due to the additional differential delay caused by the different RF path lengths) a maximum system differential delay stability of ±5 microseconds must be observed to guarantee that the transceiver in any arbitrary location within a typical overlap region X will receive the corresponding digital signal bit edges within 52 microseconds of one another.

Fortunately, it is typically possible to minimize time delay differences to on the order of a microsecond through various known techniques. For example, it is well known in the art to introduce adjustable delay networks (and phase equalization networks) in line with some or all of inter-site links L1–L3 to compensate for inherent differential link delay times (see U.S. Pat. No. 4,516,269 to Krinock, and U.S. Pat. Nos. 4,696,051 and 4,696,052 to Breeden, for example). Conventional microwave and fiber optic link channels exhibit amplitude, phase and delay characteristics that are extremely stable over long periods of time (e.g., many months), so that such additional delays, once adjusted, guarantee that a signal input into all of the inter-site links L1–L3 at the same time will arrive at the other ends of the links at almost exactly the same time. The same or additional delays can be used to compensate for different, constant delay times introduced by signal processing equipment at the sites S1–S3 to provide simultaneous coherent transmission of the signals by the different sites. For example, the above-identified Rose et al. patent application describes a technique wherein additional frequency and timing information is provided to each site over one or more particular inter-site link channels so as to eliminate timing ambiguities that may result from the use of conventional multi-level, multi-phase protocol-type modems. In this manner, the above mentioned simulcast system forces coherence at the start of data transmission on a particular established communications path, thus correcting for any multi-bit ambiguity created by the inter-site communication link modem.

Referring now to FIG. 1B which generally depicts an Ericsson, Inc. multiple site simulcast transmission system of the type described in accordance with the above mentioned Rose et al. patent, a "master" resynch (resynchronization signal) circuit 100 located at control point site C produces reference edges/tones, e.g., at 2400 Hz and 300 Hz, that are sent to each transmit site (S1–S2) on a dedicated channel over the inter-site communication links (L1–L2). Although FIG. 1B depicts only a central site and two transmit sites for illustration, actual simulcast operations may include numerous transmit sites similarly in communication with the central site. Digital and voice data aligned to the 2400 Hz and 300 Hz reference signals is also sent via the communication links (L1–L2) between control point C and the transmit sites (S1–S2). The lower (300 Hz) tone is used as a "gating" reference (for read-out timing of a broadcast data buffer at the transmit sites) and the higher (2400 Hz) tone is used as a data clocking frequency reference. Each transmit site (S1–S2) in the simulcast system includes a "universal" (i.e., common hardware) resynchronization circuit for recovering reference edges from the tones. By performance of a periodic "resynch" operation the universal resynch circuit at each simulcast system site re-aligns the broadcast data received via the inter-site links to these reference edges. Consequently, as previously mentioned above, it is required that the signal paths for these reference tones (conventionally provided via the inter-site links) be of high quality and very phase-stable as any variation or noise in these signals will have an adverse affect on overall simulcast system performance.

Conventionally, in Ericsson, Inc.'s wide band (i.e., 800 MHZ) simulcast systems the following three distinct type of information signals are distributed from a control point to multiple transmitter sites: (1) "Clear Voice" (analog voice signals); (2) low speed data (LSD); and (3) high speed data (which could be digitally encrypted voice). These signals must be carefully controlled in the time domain with the necessary precision required to provide simultaneous RF broadcasts at the multiple spatially displaced transmitter sites. "Clear Voice" is communicated to/from the transmitting sites on a dedicated delay-corrected voice channel. Similarly, the low speed data, which conventionally is common to all channels, is converted to a separate audio band signal by using a conventional FSK modem, and handled as another Clear Voice path to each site. High speed data is communicated to/from the sites at 9.6K baud via a multi-phase modem channel and adjusted for the appropriate RF transmission delay by precision digital delay circuitry and synchronization circuitry at each site. In accordance with an important aspect provided by the present invention, Ericsson, Inc.'s wide band EDACS® simulcast system is improved by altering the conventional manner and apparatus by which Clear Voice is distributed from a control point and "aligned" at the multiple transmitter sites. More specifically, the present invention contemplates distributing the analog Clear Voice signals in a digitized form so that the conventional EDACS simulcast digital data stream alignment process will produce the requisite alignment of "clear voice" signals without the need for costly analog audio alignment procedures and equipment.

Precise alignment of audio in a conventional Ericsson, Inc. EDACS Simulcast system can require a considerable amount of time, skill and equipment. The primary goal of the alignment process is to exactly match the amplitude and phase response for each transmission path. This includes the path link to the transmitter site as well the path as to the transmitter itself By digitizing the analog Clear Voice signals, the analog audio information is easily replicated and distributed between the transmitter sites and other simulcast system sites including the control point. Distributing the digitized Clear Voice over the simulcast system high speed digital data channels allows processing the digitized audio information with the EDACS ReSynch circuitry at each transmitter site so that absolute signal timing alignment for each signal path is accurately obtained. Consequently, in accordance with the present invention, alignment of the now digitized Clear Voice audio information between transmitter sites requires no additional processing since it occurs "automatically" as a consequence the of alignment of the high speed digital data stream by the EDACS ReSynch circuitry. In addition, the EDACS ReSynch will also maintain the correct Clear Voice alignment.

Each transmitter site ultimately converts the digitized audio back to analog for transmission. This is implemented identically at all sites using a digital signal processor to insure that the distributed signals arriving at each site match. The present invention also contemplates distributing "Low speed data" (LSD) to transmitter sites as high speed digital data by oversampling the LSD, distributing it to all sites and relying on the EDACS ReSynch circuitry at each site to align it to provide proper simulcast timing. To accomplish distribution of low speed data in this manner, a modification is made to the ReSynch circuitry to allow it to operate at the slower LSD bit rate. Specifically, the mechanism for initiating a ReSynch operation is modified such that whenever the simulcast system control site switches to what would ordinarily be an "analog" mode for LSD signal distribution, the A/D (analog/digital) mode indication signal line provided to each site in conventional EDACS systems is instead used to trigger a ReSynch operation (as opposed to relying, for example, on imbedded data to trigger the ReSynch). An alternative embodiment contemplates sending the LSD (low speed data) over the 9600 baud channel and inhibiting ReSynch during that time, as described in assignee's copending 900 MHZ Narrowband Simulcast system patent application. The above alternatives all send low speed data separately from Clear Voice, to be added later at the transmit site. (Another possible alternative is to embed the LSD in the digitized voice data stream and before broadcasting the Clear Voice signals the LSD could be extracted from the stream and reconstructed, assuming that the same procedure is precisely matched in the time domain at all transmitter sites).

BRIEF DESCRIPTION OF THE DRAWINGS

These and other features and advantages of the present invention will become more completely understood by referring to the following detailed description of presently preferred exemplary embodiments in conjunction with the FIGURES in which like reference numerals refer to like elements throughout.

DETAILED DESCRIPTION OF THE DRAWINGS

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so not to obscure the description of the present invention with unnecessary detail.

Figure 1A:
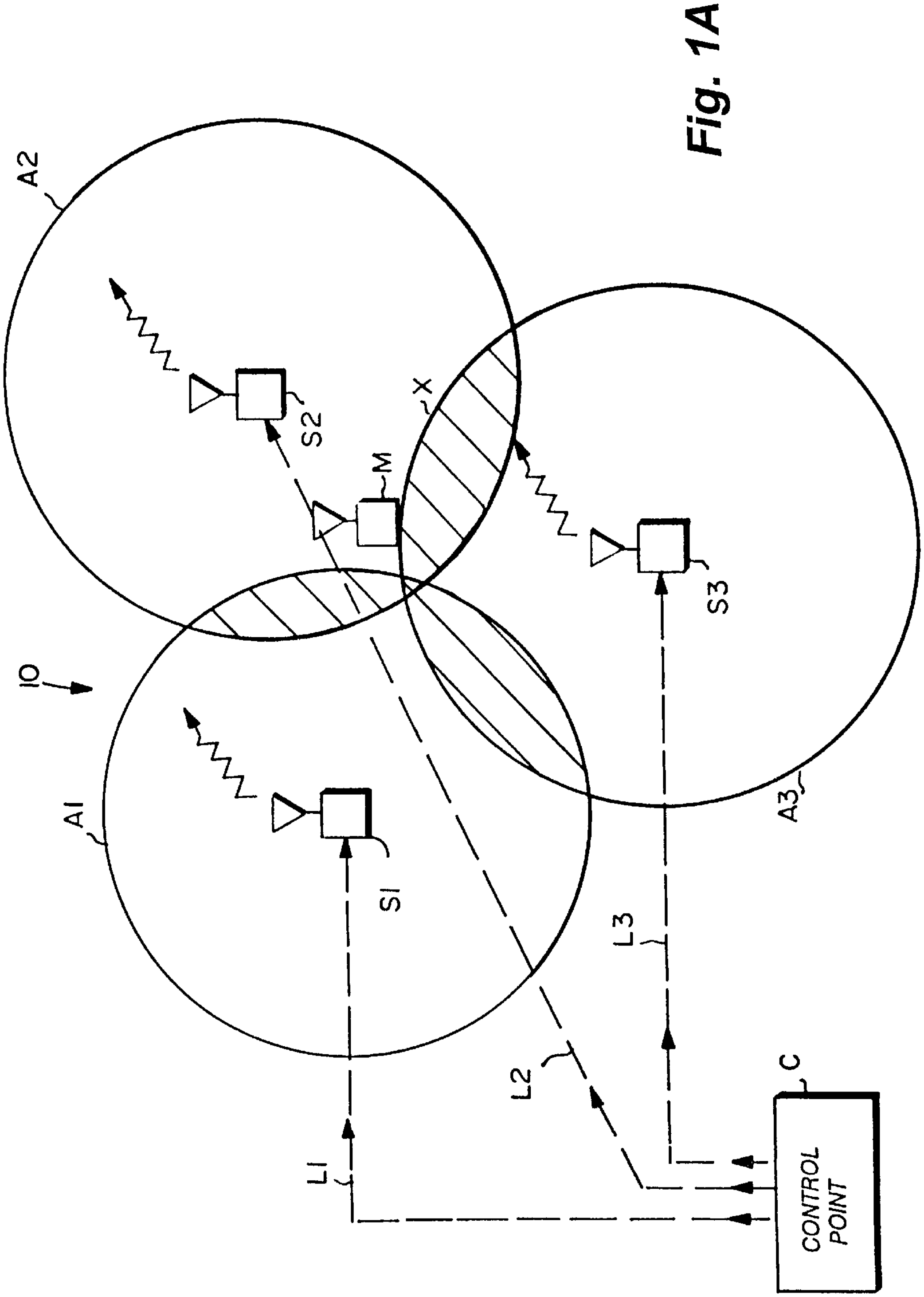
FIG. 1A is a basic diagrammatic illustration of a simple multisite RF communication simulcast system.
Figure 1B:
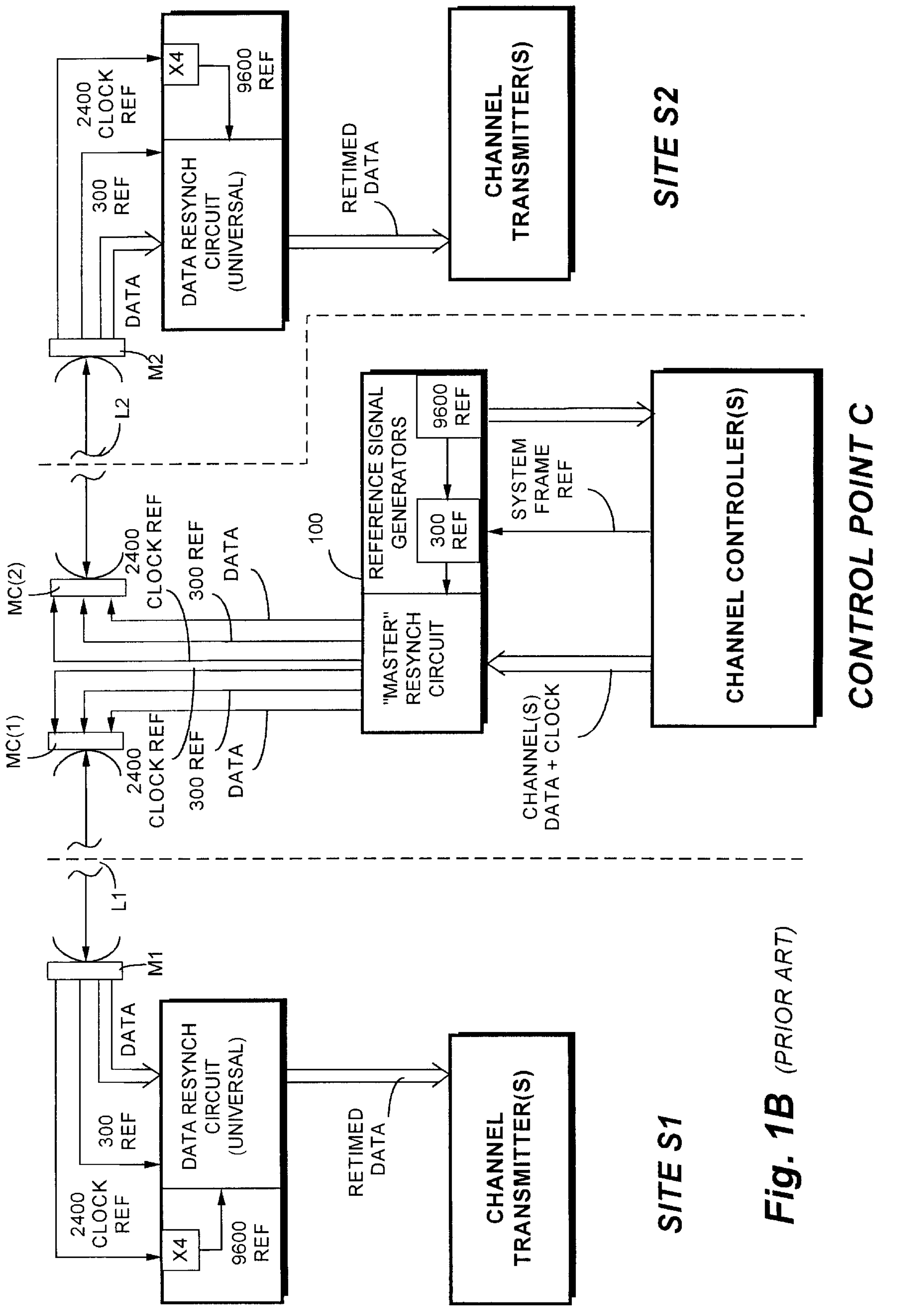
Fig. 1B (PRIOR ART)
FIG. 1B is a general schematic illustration of a central control point for a multisite RF communication simulcast system example.
Figure 2:
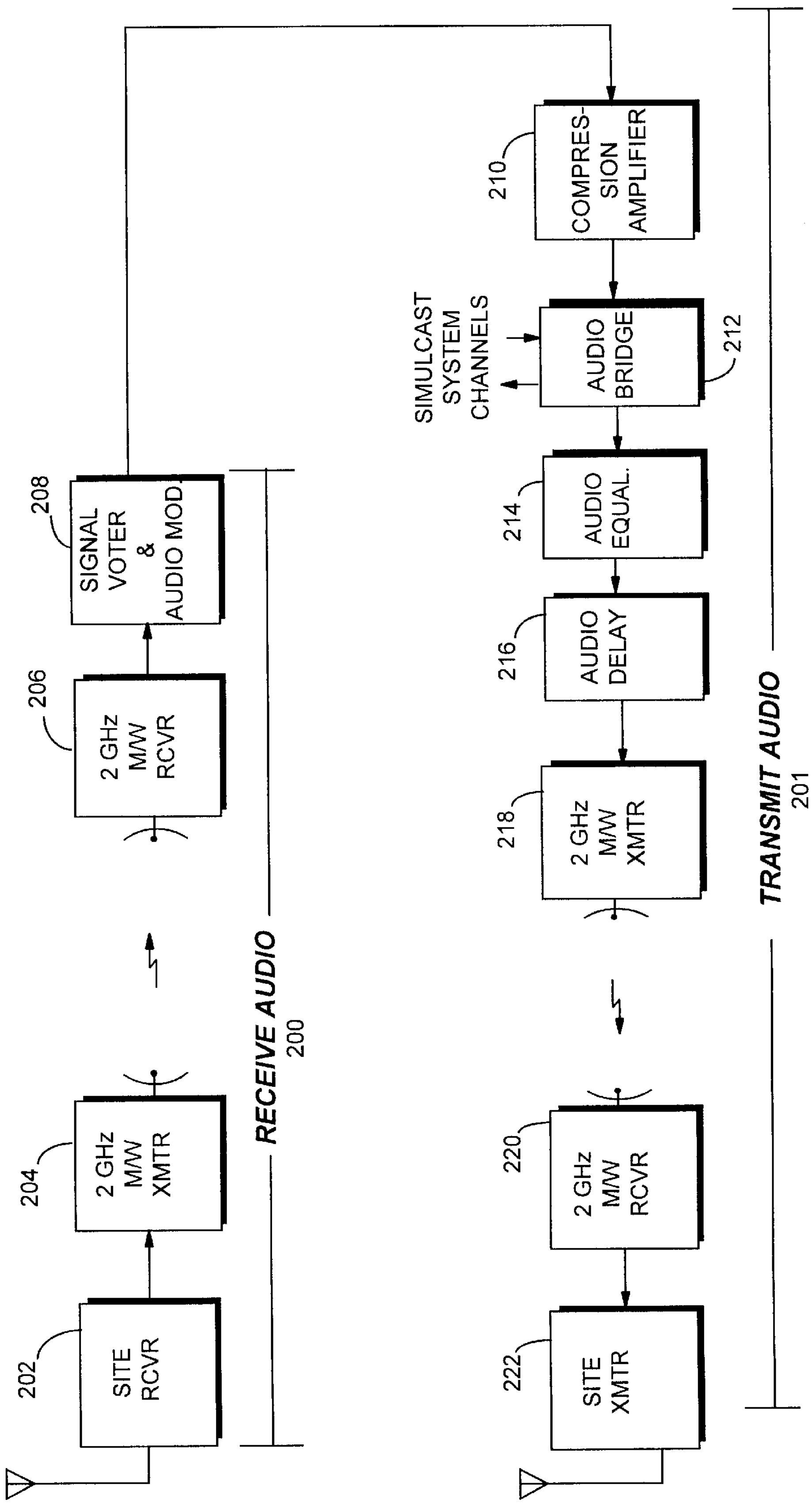
Fig. 2 (PRIOR ART)
FIG. 2 is a block diagram illustrating simulcast Clear Voice audio signal path in a conventional EDACS simulcast system.

FIG. 2 illustrates a basic example of the simulcast Clear Voice (analog audio) signal path in a conventional EDACS simulcast system. Conceptually, the Clear Voice signal path for a particular simulcast transmission site can be broken down into a "receive audio" section 200 and a "transmit audio" section 201. Receive section 200 processes incoming Clear Voice signals originating from mobile units for introduction and distribution throughout the simulcast network via a dedicated voice channel. Transmit section 201 processes outgoing simulcast Clear Voice signals via a similar dedicated voice channel. In the receive audio section, Clear Voice signals originating from mobile units (not shown) are picked up by a simulcasting site receiver 202 (e.g., S1, S2 or S3 in FIG. 1A) and communicated to a control point site over a landline link, for example, via microwave link transmitter 204 and link receiver 206. Voter/audio modulator 208 selects the incoming signal and provides proper modulation. Compression amplifier 210 produces signal compression and noise reduction for reliable routing via the voice channels between simulcast sites. Audio bridge 212 interfaces analog audio signals to communication link channels between the simulcast sites. Audio equalizer 214 and delay 216 provide signal decompression and delay correction at each site for proper simulcasting. Microwave transmitter 218 and receiver 220 form one part of the landline communication link to a simulcast broadcast site along with microwave transmitter 204 and receiver 206. Specific embodiments and operation of the foregoing elements discussed above with reference to FIG. 2 are described in greater detail in one or more of the above mentioned related applications and patents.

Figure 3:
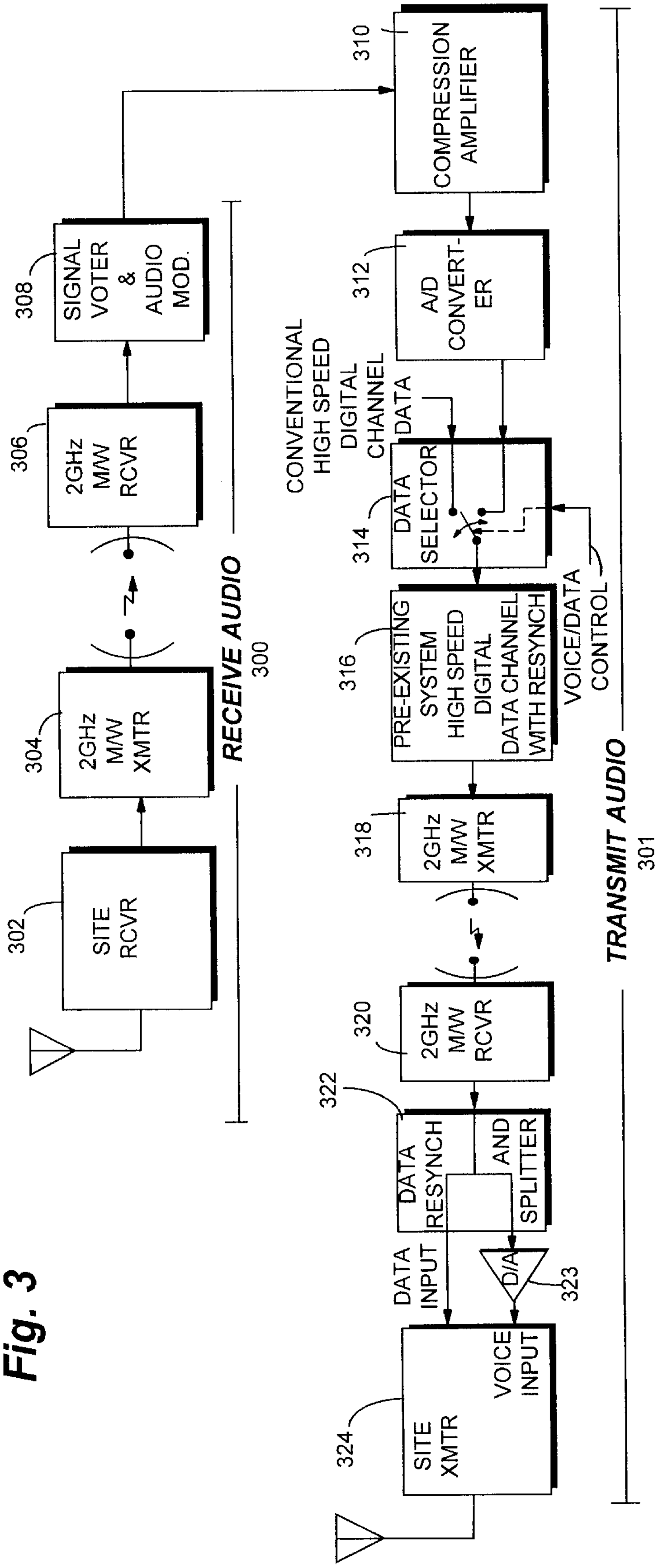
FIG. 3 is a block diagram illustrating an improved simulcast audio signal path arrangement for the distribution of Clear Voice signals in accordance with the present invention.

Referring now to FIG. 3, an improved simulcast arrangement for the distribution of Clear Voice signals in accordance with the present invention is discussed. As before, receive audio section 300 processes incoming Clear Voice signals originating from mobile units and transmit section 301 processes outgoing simulcast Clear Voice signals via similar dedicated voice channels. Clear Voice signals originating from mobile units (not shown) are picked up by site receiver 302 and communicated to a control point site via microwave link transmitter 304 and link receiver 306. Voter/audio modulator 308 selects the incoming signal and provides proper modulation. Compression amplifier 310 produces signal compression and noise reduction for reliable routing on the modem channels between simulcast sites. Analog-to-digital converter 312 converts the analog Clear Voice signals to digital signals by sampling and integrates the digitized signals through data selecting arrangement 314 into an existing high speed digital data channel 316 assigned for the associated simulcast site. Data selector arrangement 314 is controlled to select either digitized Clear Voice input from A/D converter 312 or the normal simulcast system high speed digital channel data. Preferably, voice/data control input 315 utilizes the conventional EDACS simulcast system A/D control signal line to provide selector 314 with an indication of operation in digitized Clear Voice mode. Microwave transmitter 318 and receiver 320 form part of the landline communication link to a simulcast broadcast site along with microwave transmitter 304 and receiver 206.

The conventional EDACS ReSynch unit for high speed digital data channel path 322 at the site automatically aligns the digitized Clear Voice signals in the time domain before providing the signals to digital-to-analog converter 323 for conversion to analog voice for proper simulcast broadcasting via site transmitter 324.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a simulcasting radio frequency (RF) communications system of the type having a central site distributing one or more channels of high speed digital data and unencrypted analog audio information to plural RF transmitter sites, wherein signals received at each said transmitter site exhibit time ambiguities with respect to signals received at another said transmitter site, and wherein said transmitter sites include a high speed digital data resynchronization circuit means for synchronizing the high speed digital data between said transmitter sites prior to simulcast transmitting, an improved method for distribution of unencrypted analog voice signals (clear voice) and/or low speed digital data for simulcast transmissions, comprising the steps of:

(a) converting unencrypted analog voice signals to digital voice signals at said central site;

(b) inserting said digital voice signals and/or low speed digital data onto one or more preexisting simulcast system high speed digital data communications channel for distribution to a plurality of simulcast transmitter sites;

(c) receiving said digital voice signals and/or low speed digital data at said plurality of simulcast transmitter sites via said high speed digital data channel; and (d) aligning received high speed digital data communications channel information using said high speed digital data resynchronization circuit means, said digital voice signals and/or low speed digital data received via said high speed digital data channel being automatically aligned for simulcasting by said resynchronization means.

2. A method for distribution of unencrypted analog voice signals and/or low speed data as in claim 1 wherein unencrypted analog voice signals and/or low speed data are converted to a 9.6k baud digital signal for distribution via said high speed digital data channel.

3. A method for distribution of analog voice signals as in claim 2 wherein the preexisting simulcast system high speed digital data communications channel a 9.6k baud digital data communication channel.

4. A method for distribution of analog voice signals as set forth in claim 2, wherein an analog tone signal is embedded in analog voice signals and said step (a) of converting unencrypted analog voice signals incorporates converting analog voice signals along with an embedded tone signal into digital signals; and step (c) of receiving and aligning said digital voice signal is followed by a further step of extracting said embedded tone signal from the digital voice signals.

* * * * *